(12) United States Patent
Simske

(10) Patent No.: US 8,325,969 B2
(45) Date of Patent: Dec. 4, 2012

(54) METHODS FOR MAKING AN AUTHENTICATING SYSTEM

(75) Inventor: Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1971 days.

(21) Appl. No.: 11/414,590

(22) Filed: Apr. 28, 2006

(65) Prior Publication Data

US 2007/0253593 A1    Nov. 1, 2007

(51) Int. Cl.
*G06K 9/00* (2006.01)

(52) U.S. Cl. ........................ 382/100

(58) Field of Classification Search .............. 382/100; 358/3.28; 713/176; 380/54; 283/73–93
See application file for complete search history.

(56) References Cited

U.S. PATENT DOCUMENTS

| | | | |
|---|---|---|---|
| 5,841,886 A * | 11/1998 | Rhoads | 382/115 |
| 6,307,949 B1 * | 10/2001 | Rhoads | 382/100 |
| 6,345,104 B1 * | 2/2002 | Rhoads | 382/100 |
| 6,457,651 B2 * | 10/2002 | Paul et al. | 235/494 |
| 6,574,350 B1 * | 6/2003 | Rhoads et al. | 382/100 |
| 6,577,746 B1 * | 6/2003 | Evans et al. | 382/100 |
| 6,625,295 B1 * | 9/2003 | Wolfgang et al. | 382/100 |
| 6,735,324 B1 * | 5/2004 | McKinley et al. | 382/100 |
| 6,823,075 B2 | 11/2004 | Perry | |
| 6,882,738 B2 * | 4/2005 | Davis et al. | 382/104 |
| 6,970,573 B2 * | 11/2005 | Carr et al. | 382/100 |
| 7,024,018 B2 * | 4/2006 | Petrovic | 382/100 |
| 7,123,740 B2 * | 10/2006 | McKinley | 382/100 |
| 7,142,691 B2 * | 11/2006 | Levy | 382/100 |
| 7,187,780 B2 * | 3/2007 | Tian et al. | 382/100 |
| 7,206,820 B1 * | 4/2007 | Rhoads et al. | 709/217 |
| 7,213,757 B2 * | 5/2007 | Jones et al. | 235/462.01 |
| 7,243,843 B2 * | 7/2007 | Miki et al. | 235/382 |
| 7,248,715 B2 * | 7/2007 | Levy | 382/100 |
| 7,349,552 B2 * | 3/2008 | Levy et al. | 382/100 |
| 7,457,957 B2 * | 11/2008 | Choi et al. | 713/176 |
| 7,515,730 B2 * | 4/2009 | Tian et al. | 382/100 |
| 7,532,761 B2 * | 5/2009 | Tredoux | 382/232 |
| 7,706,565 B2 * | 4/2010 | Levy et al. | 382/100 |
| 2001/0054149 A1 * | 12/2001 | Kawaguchi et al. | 713/175 |
| 2002/0146146 A1 * | 10/2002 | Miolla et al. | 382/100 |
| 2002/0170966 A1 * | 11/2002 | Hannigan et al. | 235/462.01 |
| 2003/0025423 A1 * | 2/2003 | Miller et al. | 312/100 |
| 2004/0075869 A1 * | 4/2004 | Hilton et al. | 358/3.28 |
| 2004/0101159 A1 * | 5/2004 | Butler | 382/100 |
| 2004/0181671 A1 * | 9/2004 | Brundage et al. | 713/176 |
| 2004/0230802 A1 | 11/2004 | Moon | |
| 2005/0078851 A1 * | 4/2005 | Jones et al. | 382/100 |
| 2005/0094848 A1 | 5/2005 | Carr et al. | |
| 2005/0157906 A1 | 7/2005 | Stanich et al. | |
| 2005/0190948 A1 * | 9/2005 | Isogai | 382/100 |
| 2007/0030521 A1 * | 2/2007 | Fujii et al. | 358/3.28 |

OTHER PUBLICATIONS

U.S. Appl. No. 10/961,949, filed Oct. 8, 2004, Simske et al.
U.S. Appl. No. 11/076,533, filed Mar. 8, 2005, Simske et al.

* cited by examiner

*Primary Examiner* — Vikkram Bali

(57) ABSTRACT

A method for making an authenticating system for an object includes selecting an image and adding a watermark in a predetermined area of the image. The predetermined area may be a portion of the image. The method also includes establishing the image having the watermark therein on the object, and associating the watermark with the object to render object-specific authenticating data.

19 Claims, 4 Drawing Sheets
(2 of 4 Drawing Sheet(s) Filed in Color)

METHODS FOR MAKING AN AUTHENTICATING SYSTEM

BACKGROUND

The present disclosure relates generally to methods for making an authenticating system for an object.

Secure packaging is an important component of product tracking and authenticating, as well as anti-counterfeiting initiatives. Secure packaging involves commitment to two logical extremes: providing each package with a unique ID on the "authentication extreme," and providing tamper prevention on the "packaging protection extreme." Taken to these extremes, a package may contain a 1024-bit encrypted ID and may be made of adamant to ensure its safe and secure pathway through the supply chain. Production concerns, however, may make simultaneous achievement of these two goals difficult. Encrypting and anti-tampering features are often simultaneously brought to bear on the package. Coordinating printing, packaging, encoding, and authenticating technologies, as well as planning packaging runs to accommodate all of these technologies, may be complex, and thus may be impractical for many products, and for many organizations. Production lines are generally geared to fill product and add minimum date/lot-specific information, but not necessarily with constructing a tamper-proof package while simultaneously providing high-quality security printing deterrents.

As such, it would be desirable to provide an authentication system that obviates at least some of the complexities mentioned hereinabove.

BRIEF DESCRIPTION OF THE DRAWINGS

The patent or application file contains at least one drawing executed in color. Copies of this patent or patent application-publication with color drawings(s) will be provided by the Office upon request and payment of the necessary fee.

Objects, features and advantages will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION

Embodiment(s) of the method(s) disclosed herein advantageously provide improved object authentication through the use of variable-location, variable-sized, variable-association watermarking, or combinations thereof. In embodiment(s) disclosed herein, high quality vision systems, readers and variable data printing may be used, which in some cases may not be possible on a per-package basis for high-speed production facilities.

A watermark may encode data within an image in a manner substantially visually imperceptible by a human. The encoded data may have meaning in comparison to the original image (informed detection) or without reference to the original image (blind detection). In embodiment(s) disclosed herein, watermark(s) may be added in an image(s) or portion of image(s) by any suitable methods. A non-limitative example of a suitable method is by calculating and producing the watermark(s). It is to be understood that "calculating and producing" may also be defined as "generating." Some non-limitative methods of calculating a watermark in an image(s)/portion of image(s) include spatial domain, discrete cosine transform (DCT) domain, discrete Fourier transform (DFT) domain, tiled domain; mosaic'ed domain, discrete wavelet transform (DWT) domain, or combinations thereof.

Figure 1:
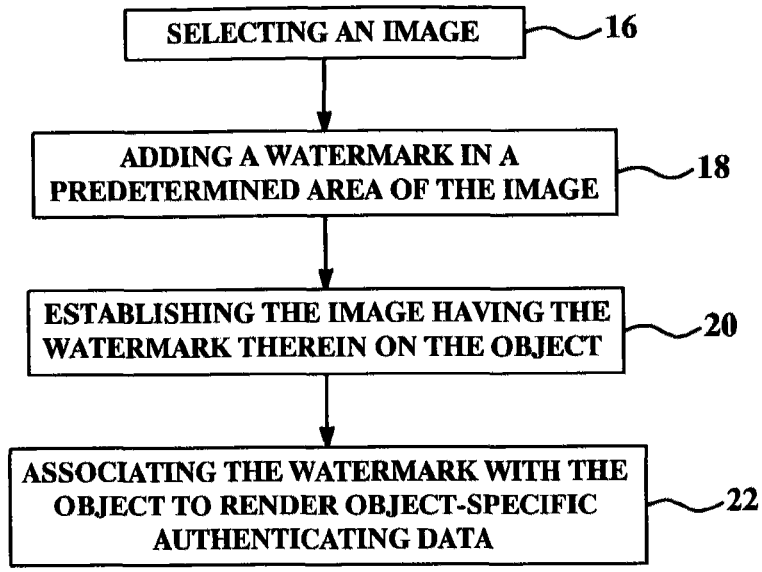
FIG. 1 is a flow diagram depicting an embodiment of a method for making an authenticating system for an object.

Referring now to FIG. 1, an embodiment of a method of making an authenticating system for an object is shown. The method generally includes: selecting an image, as depicted at reference number 16; adding a watermark in a predetermined area of the image, the predetermined area being a portion of the image, as depicted at reference number 18; establishing the image having the watermark therein on the object, as depicted at reference number 20; and associating the watermark with the object to render object-specific authenticating data, as depicted at reference number 22.

As referred to herein, the phrase "predetermined area" is to be interpreted broadly and may refer to any definable area. For example, a "predetermined area," unless otherwise specified, may include a portion of an image, substantially an entire image, or an area larger than an image. Furthermore, it is to be understood that the term "portion" is to be interpreted broadly herein and may include an area including less than all of an image. As non-limitative examples, a portion of an image may include an area being less than approximately 50% of the area of the image, or less than approximately 25% of the area of the image.

Figure 2:
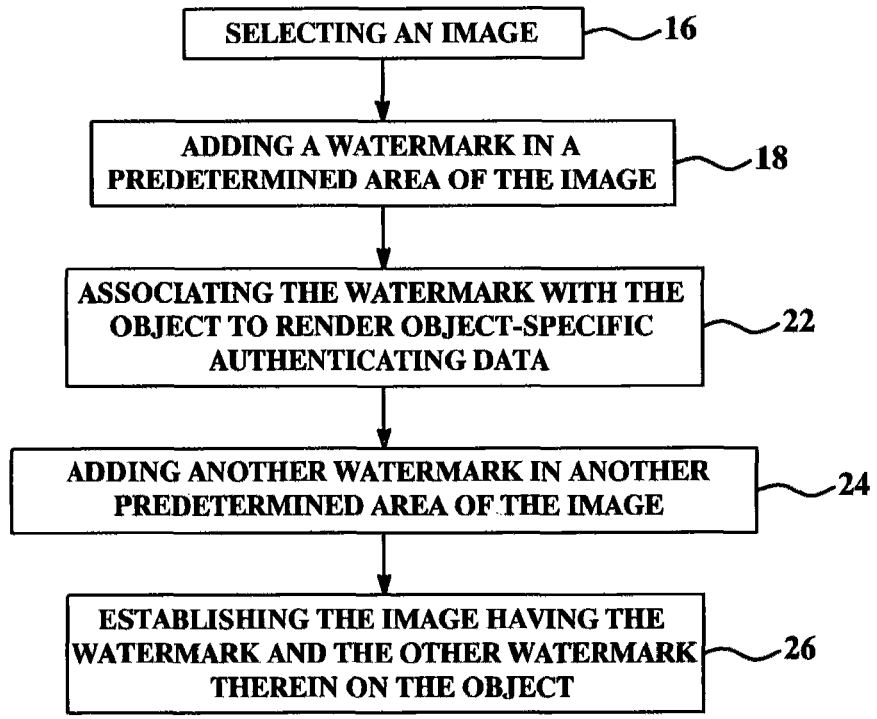
FIG. 2 is a flow diagram depicting another embodiment of a method for making an authenticating system for an object.

A more detailed embodiment of the method is depicted in FIG. 2. Similar to the embodiment of the method shown in FIG. 1, this embodiment includes selecting an image, as depicted at reference number 16; adding a watermark in a predetermined area of the image, as depicted at reference number 18; and associating the watermark with the object to render object-specific authenticating data, as depicted at reference number 22. This embodiment of the method also includes adding another watermark in another predetermined area of the image, the other watermark being encoded with information for locating the watermark, as depicted at reference number 24; and establishing the image having the watermark and the other watermark therein on the object, as depicted at reference number 26.

Figure 3:
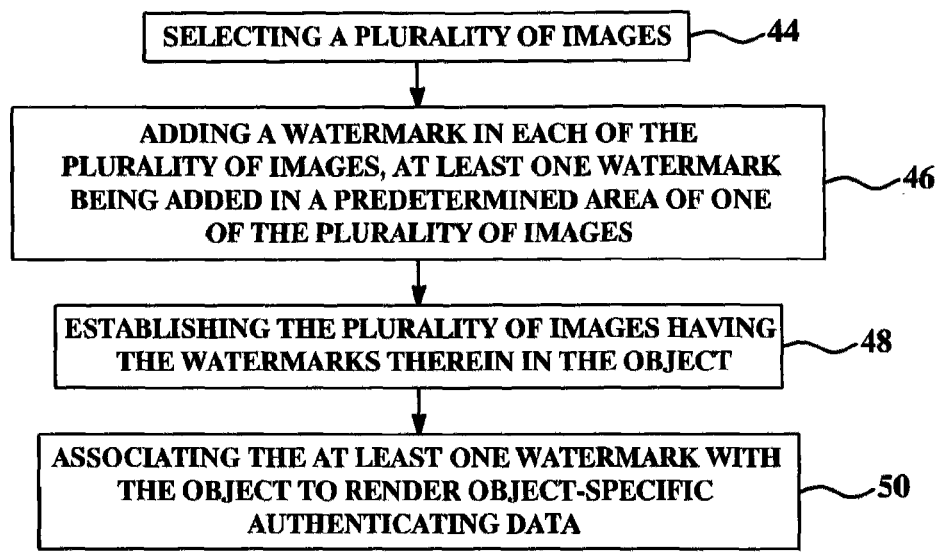
FIG. 3 is a flow diagram depicting yet another embodiment of a method for making an authenticating system for an object.

Referring now to FIG. 3, still another embodiment the method includes selecting a plurality of images, as depicted at reference number 44, and adding a watermark in each of the plurality of images, as depicted at reference number 46. In this embodiment, it is to be understood that at least one watermark is added in a predetermined area of one of the plurality of images, where the predetermined area is less than an area of the selected image. As depicted, the method further includes establishing the plurality of images having the watermark(s) therein on the object, as depicted at reference number 48; and associating the at least one watermark with the object to render object-specific authenticating data, as depicted at reference number 50.

In the embodiments disclosed herein, the authentication system is for an object. The object may be, for example, a package or a product. Where the object is a product, the image having the watermark(s) therein may be established on a package that is adapted for the product. It is to be further understood that the term "package" is to be interpreted broadly and may include, but is not limited to a unit for containing a product, displaying a product, or combinations thereof. Non-limitative examples of such a package include boxes, bags, containers, clamshells, bands, tape, wraps, ties, or the like, or combinations thereof. In an embodiment, the image and watermark may be established on a substrate (e.g. the substrate underlying a layered feature), non-limitative examples of which include labels, papers, threads, films, or combinations thereof. In a further embodiment, the substrate may be a security substrate. Security substrates may be used to hold the code that indicates where the watermark is. Security substrates may also be linked to the watermark data through hashing, sequential hashing, encryption, or combinations thereof, replication data, or through other means of data association.

Figure 4:
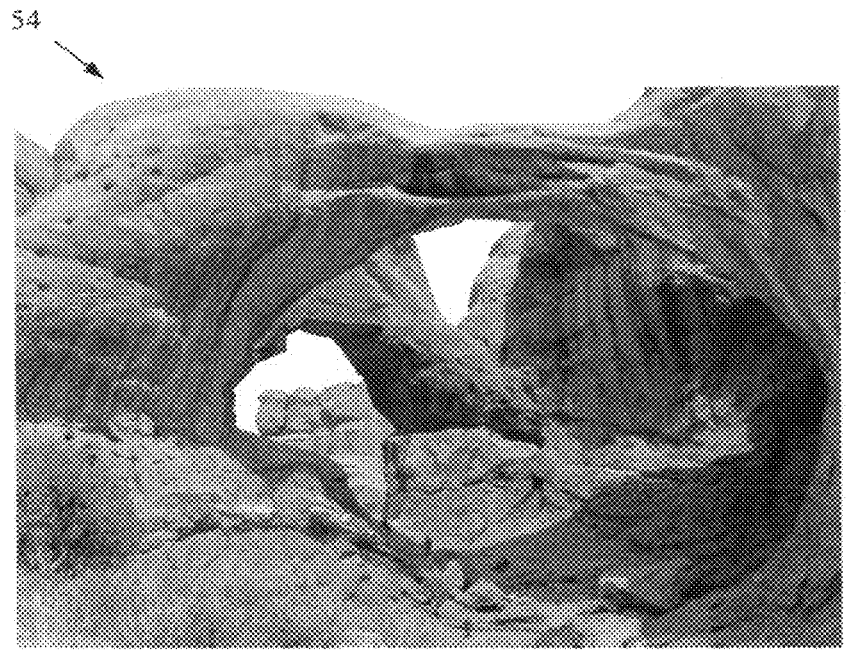
FIG. 4 is a photograph of an embodiment of an image.

Referring now to FIG. 4, any suitable image 54 may be selected for use with the methods described herein. As non-limitative examples, the image 54 may be selected at random, may be based on personal or consumer preferences, or it may be related to a product, package or object having the image established thereon. The image 54 may include any suitable or desirable numeric indicia, alphanumeric indicia, graphical indicia, or combinations thereof. It is to be understood that the image 54 may be selected, manipulated, created, or combinations thereof via a computer program or other suitable electronic device to produce a printed area in which one or more of hue, saturation, and intensity may be varied.

FIG. 4 illustrates an example embodiment of a suitable graphical indicia image 54. It is to be understood that a plurality of images 54 may include two or more separate images 54 with none, one, or a plurality of sub-images within a larger image 54 (note that the same larger image can appear on each of many objects, with a different plurality of sub-images on each).

Figure 5:
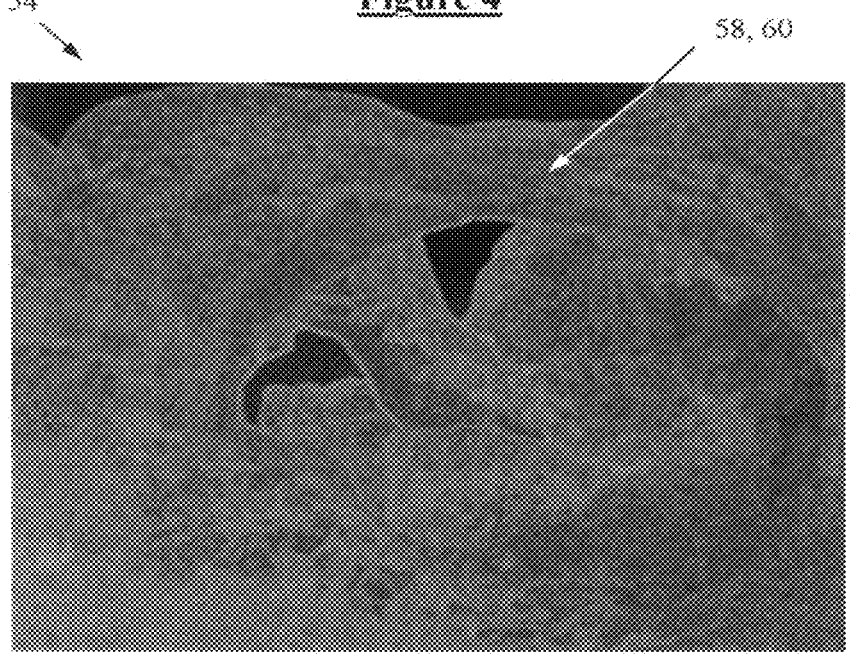
FIG. 5 is a photograph of an embodiment of a watermark added in the image of FIG. 4, enhanced for clarity.

FIG. 5 illustrates an embodiment of a watermark 58 added in the image 54 of FIG. 4. It is to be understood that the watermark 58 graphically depicts the difference between the original image 54 and an image having a watermark 58 added therein. The black/white contrast in FIG. 4 is enhanced in FIG. 5 by a factor of about 16 for emphasis and improved visibility/clarity. The watermark 58 in this embodiment is added in substantially the entire image 54, and may also be referred to herein as the larger watermark 58, 60. It is to be understood that the watermark(s) 58 may be added in a portion of an image 54, or in various different portions of an image 54.

Figure 6:
FIG. 6 is a photograph of an embodiment of the image of FIG. 4 having a predetermined area removed from the image.

Referring now to FIG. 6, a non-limiting example of a predetermined area 62 in which a watermark 58 may be added is depicted in the image 54. It is to be understood that the predetermined area 62 may be any suitable regular or irregular shape. As non-limitative examples, the predetermined area 62 may be a circle, a square, a rectangle, a triangle, other polygons, any other suitable geometric shape, or combinations thereof. The predetermined area 62 may be defined by a starting x-coordinate, a starting y-coordinate, and when applicable, a width, a height, other appropriate shape-defining data, such as radius, vertices, etc., or combinations thereof.

In an embodiment, an image 54 is divided into a checkerboard pattern of predetermined areas 62, whereby each predetermined area 62 may independently have a watermark 58 added therein. For example, an image 54 may be divided into 10×10 predetermined areas 62, which may result in $2^{100}$, or $1.26765 \times 10^{30}$ permutations of the image 54. Each permutation may have a different combination of watermarks 58 in the 100 predetermined areas 62.

Figure 7:
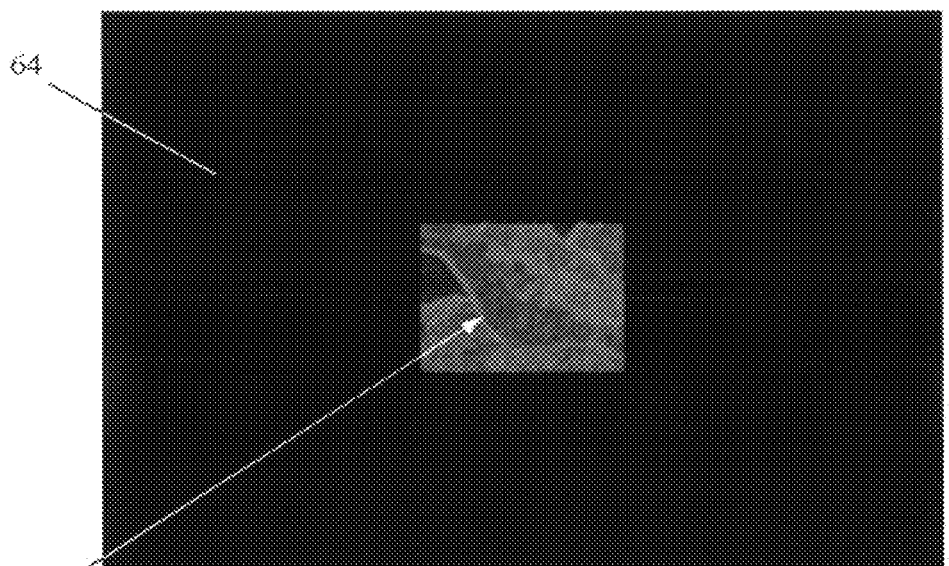
FIG. 7 is a photograph of an embodiment of a watermark created in the predetermined area of the image of FIG. 6, enhanced for clarity.

FIG. 7 illustrates an embodiment of a watermark 58 created in the predetermined area 62 of the image 54 of FIG. 6. The watermark 58 in this embodiment is added in a portion of the image 54, and may also be referred to herein as the smaller watermark 58, 60'.

As with FIGS. 4 and 5, the watermark 58 shown in FIG. 7 illustrates the difference between the original image 54 (shown in FIG. 4) and an image having a watermark 58 added therein, and again, the black/white contrast is enhanced by a factor of about 16 for emphasis and improved visibility/clarity. It is to be understood that the area 64 surrounding the watermark 58 is black, at least in part, because no watermark 58 exists therein. As such, this area 70 is representative of the unchanged image 54. As such, FIG. 7 depicts a single, smaller watermark 58, 60' located by subtracting one image from the other and then scaling up (by ~30) the remainder image.

In an embodiment of the method where a plurality of images 54 and watermarks 58 are added and established, it is to be understood that one of the watermarks 58, 60 may be established in a predetermined area 62 that includes substantially all of the image 54 (like that shown in FIG. 5) and another of the watermarks 58, 60' may be established in a predetermined area 62 that includes a portion of the image 54 (like that shown in FIG. 7). Generally, the smaller watermark 58, 60' formed in a portion of the image 54 may partially overlap the larger watermark 58, 60 formed in substantially the entire image 54, may completely overlap the larger watermark 58, 60, or may not overlap the larger watermark 58, 60. In an embodiment, the smaller watermark 58, 60' may have stronger encoding than the larger watermark 58, 60, and (or alternately) may be encoded with a different method. It is to be understood that, if desired, watermarking technique(s) may be used for the larger watermark(s) 58, 60 that are different than watermarking technique(s) used for the smaller watermark(s) 58, 60'. Further, each of the smaller watermarks 58, 60' may, if desired, differ in watermarking technique, as well.

It is to be further understood that when a plurality of images 54 are used, one or more of the images may be sub-images or locations in a larger image 54 where the watermark(s) 58 are established.

In embodiment(s) of the method described herein, the image 54 may be established (or pre-printed) on the object, package, product, or the like, and then the watermark(s) 58 may be added therein. In other embodiments of the method described herein, the image 54 and the watermark(s) 58 are selected and established electronically and then are physically established (e.g., via printing or other suitable methods) substantially simultaneously on the object, package, product, or the like. In this embodiment, the watermark(s) 58 is/are embedded in the image 54, and so is/are rendered with the image in any establishing process.

As previously stated, the watermark 58 may be calculated via various technologies, non-limitative embodiments of which include, spatial domain, discrete cosine transform (DCT) domain, discrete Fourier transform (DFT) domain, tiled domain; mosaic'ed domain, discrete wavelet transform (DWT) domain, or combinations thereof.

Furthermore, in an embodiment, adding the watermark 58 in the predetermined area 62 of the image 54 includes identifying each of a plurality of technologies available (some examples of which are recited immediately above) for use in the watermark 58. For example, if a weak watermark 58, 60' is desired, then it is non-conflicting with the larger watermark 58, 60, meaning both may be read successfully in spite of overlapping in the image. This may be tested beforehand to determine if there are any potential compatibility issues. It is to be understood that this "testing beforehand" is sensitivity analysis, as discussed further below. One or more combinations of the technologies may provide a predetermined number of unique representations from which one of the combinations may be selected for implementation in the watermark 58.

Establishing the image 54 and watermark(s), such as 58, 60, 60' may bed accomplished in association with one or more of the following techniques: variable data printing; variable bar coding, which may be covert, overt, or semi-overt; variable image coding, where images or combinations thereof convey meaning; lenticular printing (which may or may not include watermarking), including 3-dimensional, motion, flip, inversion, layered effects, or combinations thereof; moiré or indicia-based watermarking, which may be covert until viewed under a lens; metallic printing; conductive printing; microtexting, which may be printed at a difficult to reproduce resolution or line screen, or both; copy detection patterning, whereby targets are scanned, have their entropy calculated, and then are rendered authentic or non-authentic; digital watermarking, which may be fragile or robust; capacitive finishing; insulative finishing, or combinations thereof.

In an embodiment where one or more of the image 54 and watermark(s) 58 are printed, any suitable ink may be used. Non-limitative examples of such inks include transparent ink, magnetic ink, invisible ink, opaque ink, conductive ink, quantum dot ink, or combinations thereof. It is to be understood that invisible ink may include, for example, ultraviolet (UV) ink or infrared ink.

After the image 54 and watermark(s) 58 are established on the object, the watermark(s) 58 is/are associated with the object to render object-specific authenticating data. The data in the watermark is generally referred to as the "payload," and is usually a short (8-32 bit) message stored in the watermark. It is to be understood that the object-specific authenticating data may include object-identifying information (non-limitative examples of which include product name, size, color, manufacturer, lot number, expiration date, dosage, ingredients, identification numbers, serial numbers, universal bar codes (UBC), or the like, or combinations thereof). Further, it is to be understood that as some data is associated with the object, other identifying information may be present (and tracked), but may not be specifically linked with the watermark(s) 58. For example, the watermark(s) 58 may not hash all tracked data, since some data will generally not be revealed except under recall or evidentiary conditions.

The object-specific authenticating data that is rendered by associating the watermark 58 with the object may be stored in any suitable manner. In an embodiment, the object-specific authenticating data is encrypted and transmitted to a record, database, or combinations thereof. The object-specific authenticating data may be encrypted by a scanning device, by symmetric encryption, asymmetric encryption, mass sterilization, randomized identifiers, or the like, or combinations thereof. As a non-limitative example, the record may be stored in a remotely-located secured server or registry. The record may also be adapted for retrieval from the secured server or registry when object authentication is desired.

In an embodiment, a branding, security, etc. feature may be established on the object. It is to be understood that the object-specific authenticating data may be encrypted and associated with the branding, security, etc. feature. The branding, security, etc. feature may include, but is not limited to, for example, a bar code, radio frequency identification (RFID), a micro-scale device containing memory, a bubble tag, or a DNA tag.

For authentication purposes, at any time after the object-specific authenticating data is recorded/associated, the watermark 58 on an object may be read to render object information data. A scanning device may be utilized to read the watermark 58. The object-specific authentication data may then be retrieved from the record or media feature and compared with the object information data. Such a comparison will indicate whether the object is authentic or not. For example, if the comparison indicates that the object-specific authentication data and object information data match, the object is authentic; however, if the comparison indicates that the two sets of data do not substantially match, the object is not authentic.

Sensitivity analysis may be utilized when comparing the object information data to the object-specific authenticating data to determine optimal parameters for deployment. For example, a simple table may be generated showing which larger 58, 60 and smaller watermark 58, 60' combinations are allowed. Test cases may then be run for the large watermark 58, 60 and 1 . . . N smaller watermarks 58, 60' to substantially ensure that they can be independently read in spite of overlapping in area(s). Test cases may also be run for the combinations of 1 . . . N smaller watermarks 58, 60' independently, as described below. A method of sensitivity analysis is described in pending U.S. patent application Ser. No. 11/076, 533, filed on Mar. 8, 2005.

As an example, if sensitivity analysis indicates that there are 10,000 different starting x-coordinate (x), starting y-coordinate (y), width (w), and height (h) variations with six-sigma independence for a predetermined area 62 for the image of FIG. 4, then 10,000 variants of FIG. 7 may be generated. Each of the 10,000 variants may have a unique x, y, w, h set as compared to the other 9,999 variants in the set. The 10,000 variants may be stored in a database and archived for future use or may be directly established on an object. This means that watermark (x,y,w,h) cannot be successfully read using areas defined by $(x\pm\Delta x,y,w,h)$, $(x,y\pm\Delta y,w,h)$, $(x,y,w\pm\Delta w,h)$, or $(x,y,w,h\pm\Delta h)$, where the $\Delta$ value is the minimum difference specified by the sensitivity analysis.

In addition to the one or more watermarks 58 established for object authentication, one or more decoy watermarks may be added in the image 54. As such, the image 54 may be established on the object with one or more authenticating watermark(s) 58 therein and the decoy watermark(s) therein. It is to be understood that a decoy watermark may appear identical to an authenticating watermark 58, but the decoy watermark contains no authenticating capabilities, such as providing object-specific authenticating data or providing information for locating an authenticating watermark 58. As such, in an embodiment, the primary (or sole) purpose of a decoy watermark is to evade a potential counterfeiter and to allow changing the nature of the security without changing the watermark(s) 58. For example, the decoy watermark may contain a payload not linked in any way to other elements on the object, making it harder to reverse engineer.

While several embodiments have been described in detail, it will be apparent to those skilled in the art that the disclosed embodiments may be modified. Therefore, the foregoing description is to be considered exemplary rather than limiting.

What is claimed is:

1. A method for making an authenticating system for an object, the method comprising:
   selecting an image;
   adding a watermark in a predetermined area of the image, the predetermined area being a portion of the image;
   adding an other watermark in an other area of the image such that the other watermark overlaps with the watermark in the image;
   establishing the image having the watermarks therein on the object or on a package for the object using opaque ink, whereby the image, the watermark, and the other watermark are printed with the opaque ink; and
   associating at least one of the watermarks with the object to render object-specific authenticating data.

2. The method of claim 1 wherein the predetermined area is defined by at least one of a starting x-coordinate, a starting y-coordinate, a width, a height, a radius, one or more vertices, or combinations thereof.

3. The method of claim 1 wherein the predetermined area is a regular shape or an irregular shape, and wherein the other area is an entire area of the image.

4. The method of claim 1 wherein adding the watermarks is accomplished by calculating and producing the watermarks, and wherein the calculating is accomplished via at least one of spatial domain; discrete cosine transform domain; discrete Fourier transform domain; tiled domain; mosaic'ed domain; or discrete wavelet transform domain.

5. The method of claim 1 wherein the object is a product.

6. The method of claim 1 wherein adding the watermark in the predetermined area of the image further includes:
   identifying each of a plurality of technologies available for use in the watermark;
   identifying one or more combinations of the plurality of technologies that provide a predetermined number of unique representations; and
   selecting one of the combinations for implementation in the watermark; and wherein adding the other watermark in the other area of the image includes:
   identifying each of a plurality of technologies available for use in the other watermark;
   identifying one or more combinations of the plurality of technologies that provide a predetermined number of unique representations; and
   selecting one of the combinations for implementation in the other watermark such that the other watermark is readable in spite of overlapping the watermark.

7. The method of claim wherein the object is a security substrate.

8. The method of claim 1, further comprising:
   encrypting the object-specific authenticating data; and
   transmitting the encrypted object-specific authenticating data to a record.

9. The method of claim 8, further comprising:
   reading the watermark or the other watermark to render object information data; and
   receiving information regarding authenticity of the object after comparison of the object information data to the object-specific authenticating data.

10. The method of claim 9 wherein comparison of the object information data to the object-specific authenticating data further includes performing sensitivity analysis to determine optimal parameters for deployment such that both the watermark and the other watermark are independently readable in spite of the overlap.

11. The method of claim 1, further comprising:
   establishing at least one of a branding feature, a security feature, or combinations thereof on the object;
   encrypting the object-specific authenticating data; and
   associating the encrypted object-specific authenticating data with the at least one of the branding feature, the security feature, or combinations thereof.

12. The method of claim 11, further comprising:
   reading the watermark or the other watermark to render object information data; and
   receiving information regarding authenticity of the object after comparison of the object information data to the object-specific authenticating data.

13. The method of claim 12 wherein the at least one of the branding feature, the security feature, or combinations thereof includes at least one of a bar code, RFID, a microscale device containing memory, a bubble tag, or a DNA tag.

14. A method for making an authenticating system for an object, the method comprising:
   selecting an image;
   adding a watermark in a predetermined area of the image, the predetermined area being a portion of the image;
   associating the watermark with the object to render object-specific authenticating data;
   adding an other watermark in an other predetermined area of the image, the other watermark being encoded with information for locating the watermark and the other predetermined area overlapping with the predetermined area, wherein decoding of the other watermark identifies the location of the watermark; and
   establishing the image having the watermark and the other watermark therein on the object.

15. The method of claim 14 wherein the other predetermined area includes the entire image.

16. The method of claim 14 wherein the watermark has at least one of different strength encoding than the other watermark; or different encoding than the other watermark.

17. The method of claim 14 wherein, prior to establishing the image having the watermark and the other watermark therein on the object, the method further comprises adding at least one decoy watermark in the image.

18. The method of claim 14 wherein the image, the watermark, and the other watermark are printed with opaque ink on the object.

19. A method for making an authenticating system for an object, the method comprising:
   selecting a plurality of images;
   adding a watermark in each of the plurality of images, at least one watermark being added in a predetermined area of one of the plurality of images, the predetermined area being less than an area of the one of the plurality of images;
   adding an other watermark in the one of the plurality of images such that the other watermark covers an other area of the one of the plurality of images, and the other watermark overlaps with the at least one watermark;
   encoding the other watermark with information for locating the at least one watermark such that decoding of the other watermark identifies the location of the at least one watermark;
   establishing the plurality of images having the watermarks therein on the object; and
   associating the at least one watermark with the object to render object-specific authenticating data.

* * * * *

UNITED STATES PATENT AND TRADEMARK OFFICE
CERTIFICATE OF CORRECTION

| | | |
|---|---|---|
| PATENT NO. | : 8,325,969 B2 | Page 1 of 1 |
| APPLICATION NO. | : 11/414590 | |
| DATED | : December 4, 2012 | |
| INVENTOR(S) | : Steven J. Simske | |

It is certified that error appears in the above-identified patent and that said Letters Patent is hereby corrected as shown below:

In column 7, line 48, in Claim 7, delete "claim wherein" and insert -- claim 1 wherein --, therefor.

Signed and Sealed this
Twelfth Day of March, 2013

Teresa Stanek Rea
*Acting Director of the United States Patent and Trademark Office*